United States Patent
Tiemann et al.

(10) Patent No.: US 6,209,416 B1
(45) Date of Patent: *Apr. 3, 2001

(54) SAFETY DEVICE FOR SUPPORTING A PEDAL IN A MOTOR VEHICLE

(75) Inventors: Burkhard Tiemann, Bochum; Christoph Meese, Cologne; Jürgen Herold, Aschaffenburg, all of (DE)

(73) Assignee: Ed. Scharwächter GmbH, Remscheid (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/141,471

(22) Filed: Aug. 27, 1998

(30) Foreign Application Priority Data

Aug. 27, 1997 (DE) .............................. 197 37 114

(51) Int. Cl.[7] .............................. G05G 1/14; B60K 28/14
(52) U.S. Cl. .............................................................. 74/512
(58) Field of Search ............................ 74/512, 560, 513; 180/274, 275

(56) References Cited

U.S. PATENT DOCUMENTS 5,848,558 * 12/1998 Isono et al. .............................. 74/512

FOREIGN PATENT DOCUMENTS

| 3533420 | * | 3/1987 | (DE) | 74/512 |
| 4340633 | * | 6/1994 | (DE) | 74/512 |
| 4409235 | * | 10/1994 | (DE) | 74/512 |

* cited by examiner

Primary Examiner—Mary Ann Green
(74) Attorney, Agent, or Firm—Brown & Wood, LLP

(57) ABSTRACT

A safety device for supporting a pedal in a motor vehicle and which includes a bearing support for supporting a pedal shaft of the pedal and arranged between a front wall of the motor vehicle which is noticeably deformed inward into a passenger compartment during a frontal collision of the motor vehicle, and a cross-member which is located in the passenger compartment in a spaced relationship with respect to the front wall, is secured to a motor vehicle body, and does not substantially change a spacial position thereof during the frontal collision, with the bearing support including radially open recesses in which the pedal shaft is supported, and with the safety device further including a brace which lifts the pedal shaft of the recesses of the bearing support in case of the frontal collision and which has one of its ends supported against the front wall and another of its ends engaging the pedal shaft support forming part of the bearing support.

5 Claims, 2 Drawing Sheets

SAFETY DEVICE FOR SUPPORTING A PEDAL IN A MOTOR VEHICLE

RELATED APPLICATION

The present application is related to U.S. application Ser. No. 09/128,357 filed on Aug. 3, 1998 by two of applicants herein now U.S. Pat. No. 6,101,894.

BACKGROUND OF THE INVENTION

1. Field of the Invention

The present invention relates to a safety device for supporting a pedal, in particular a braking pedal, in a motor vehicle and including a bearing support for supporting a pedal shaft of the pedal and arranged between a wall portion of a front wall of the motor vehicle, which is noticeably deformed inward into a passenger compartment during a frontal collision of the passenger compartment in a spaced relationship with the respect to the front wall, is secured to a motor vehicle body, and does not substantially change its spacial position during the frontal collision. The pedal shaft is retained in the bearing support which, under normal operational conditions of the motor vehicle, absorbs the reaction forces generated upon actuation of the pedal necessitated by the normal operational conditions of the motor vehicle. During a frontal collision of the motor vehicle, the pedal shaft is released by a release mechanism supported on the cross-member.

2. Description of the Prior Art

During a collision of a motor vehicle, there exists a danger that as a result of deformation of the front of the vehicle, the parts arranged in the region of the front wall of the vehicle such as, e.g., the steering gear or braking elements, in particular, the brake power booster will be displaced inward in the direction toward the passenger compartment, in particular, toward the driver.

Therefore, different means for removal of the operational devices which are arranged in the region of the driver's seat, in case of an accident and, in particular, in case of a frontal collision, were proposed. Thus, U.S. application Ser. No. 09/128,357 U.S. Pat. No. 6,101,894 assigned to the assignee of the present invention contemplates providing in the bearing support radially open support of bearing means in which the pedal shaft is supported and which absorbs reaction forces generated during actuation of the pedal which is necessitated by operational conditions of the vehicle, and by further providing means for lifting the pedal shaft of the bearing support in case of a frontal collision. The lifting means is formed as a sheet metal member having a U-shaped end portion which engages the pedal shaft from beneath. The solution proposed by U.S. application Ser. No. 09/128,357 U.S. Pat. No. 6,101,894 insures, in comparison with the previous solutions, a substantially improved safety in the region of the foot area in front of the driver's seat but it is associated with relatively large expenses connected with providing means for effecting displacement of the lifting means.

Accordingly, an object of the present invention is to improve the operational reliability of the safety device disclosed in U.S. application Ser. No. 09/128,357 U.S Pat. No. 6,101,894 while reducing the costs associated with its manufacture and mounting.

Another object of the present invention is to reduce the mounting space necessary to accommodate the safety device in the motor vehicle.

SUMMARY OF THE INVENTION

These and other objects of the present invention, which will become apparent hereinafter, are achieved by forming the lifting means or the lifting element as a brace having one of its opposite ends supported against the front wall of the motor vehicle, and having another of its opposite ends engaging the support member, in which the pedal shaft and/or its support member is received, from beneath.

The lifting means—forming brace acts as a lever which is supported against the front wall at one of its end and, with its other end, lifts the pedal shaft and/or its support from their position in the bearing support when it moves upward as a result of a change in spacing between the front wall and the pedal shaft and/or the pedal shaft support-receiving recess or opening in the bearing support. The spacing is usually changed in case of a frontal collision of a motor vehicle with an obstacle.

According to an advantageous embodiment of the safety device according to the present invention, the end of the brace, which engages the pedal shaft support, is located, with respect to a horizontal, above the brace end supported against the front wall. The brace is generally formed as a section of a hollow profile with the one end of the brace which engages the pedal shaft support, being formed as a bent foot portion extending parallel to the front wall, and with the another end of the brace, being formed as a segment of a shell embracing the pedal shaft support.

Forming the end supported against the front wall as a bent foot portion facilitates the attachment of this end to the front wall or a comparable portion of the motor vehicle body, on one hand, and on the other hand, permits to provide a definite binding point which permits to obtain a predetermined pivot path.

According to a further development of the present invention, the pedal shaft and the pedal shaft support are retained in, preferably, substantially U-shaped, upwardly opening, recessed formed in the bearing support with a retaining member which actually absorbs the reaction forces generated upon actuation of the pedal necessitated by the operational conditions of the motor vehicle. However, during a frontal collision of the motor vehicle, the retaining member, in cooperation with the brace-shaped lifting element, which moves relative to the bearing support, releases the pedal shaft. The retaining member is advantageously formed as an ejectionable shaped piece. The retaining member, which functions as a securing element, clampingly engages the edges of the pedal shaft and the pedal shaft support-receiving recess in the bearing support.

Advantageously, the retaining member is formed a s spring clip which is engaged in the pedal shaft and the pedal shaft support-receiving U-shaped recess or opening and is arranged transverse to the longitudinal extension of the pedal shaft. The clip is lifted, together with the pedal shaft, from the fixed support half by the brace-shaped lifting element during a frontal collision.

According to a particular advantageous embodiment of the present invention, the longitudinal axis of the brace-shaped lifting element forms with the longitudinal axis of the U-shaped recess an angle greater than 90°.

While the attachment of the bearing support and, thus, of the pedal shaft to cross-member fixedly secured to the vehicle body, has certain advantages, it is also possible to have the bearing support attached to the front wall of the motor vehicle, and to have the fixed end of the brace-shaped lifting element attached to the cross-member. The main thing is to insure, in case of the frontal collision of the motor vehicle, relative movement between the bearing support and the lifting element so that the pedal shaft is compulsory lifted of its support.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
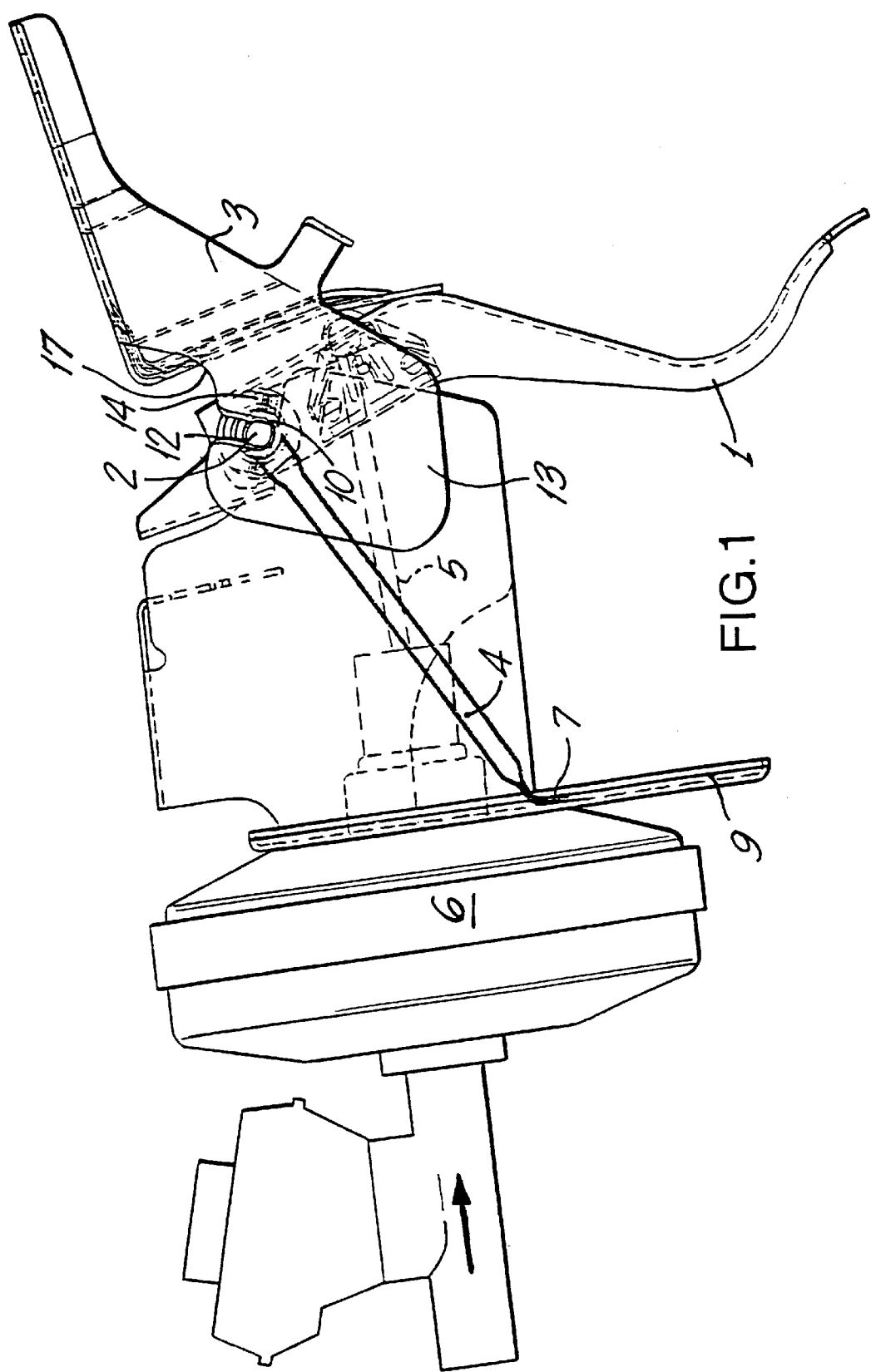
FIG. 1 shows a side view of a pedal suspension, which is located in a foot region of a motor vehicle, during a normal operation of the motor vehicle.

The drawings show only those portions of a foot region of a motor vehicle and of a pedal suspension which are necessary for understanding of the present invention. In particular, the drawings show a braking pedal 1 which cooperates with a brake power booster 6 and to which it is connected with a push rod 5. The pedal suspension, which is shown in the drawings, essentially includes the pedal 1, a pedal shaft 2, a bearing support 3 for supporting the pedal shaft 2, and a lifting element 4 associated with the pedal shaft 2. The lifting element 4 is formed as a hollow brace which is secured with its foot collapsible portion 7 to a wall region of a front wall 9 which is located opposite a crossmember (not shown in the drawings) which is secured to the motor vehicle body. The end 10 of the brace-shaped lifting element 4, which is located opposite to the foot portion, cooperates with pedal 2. The end 10 is formed as a segment of shell engaging the outer circumference of the pedal support 11. The pedal shaft 2 and its support 11 are received in U-shaped, upwardly opening, recesses 12 formed in legs 13 of the bearing support 3. The pedal shaft 2 and the support 11 are secured in their position by a retaining member 14 which actually absorbs the reaction forces which are generated upon actuation of the pedal 1 in accordance with existing operational conditions of the motor vehicle.

Figure 2:
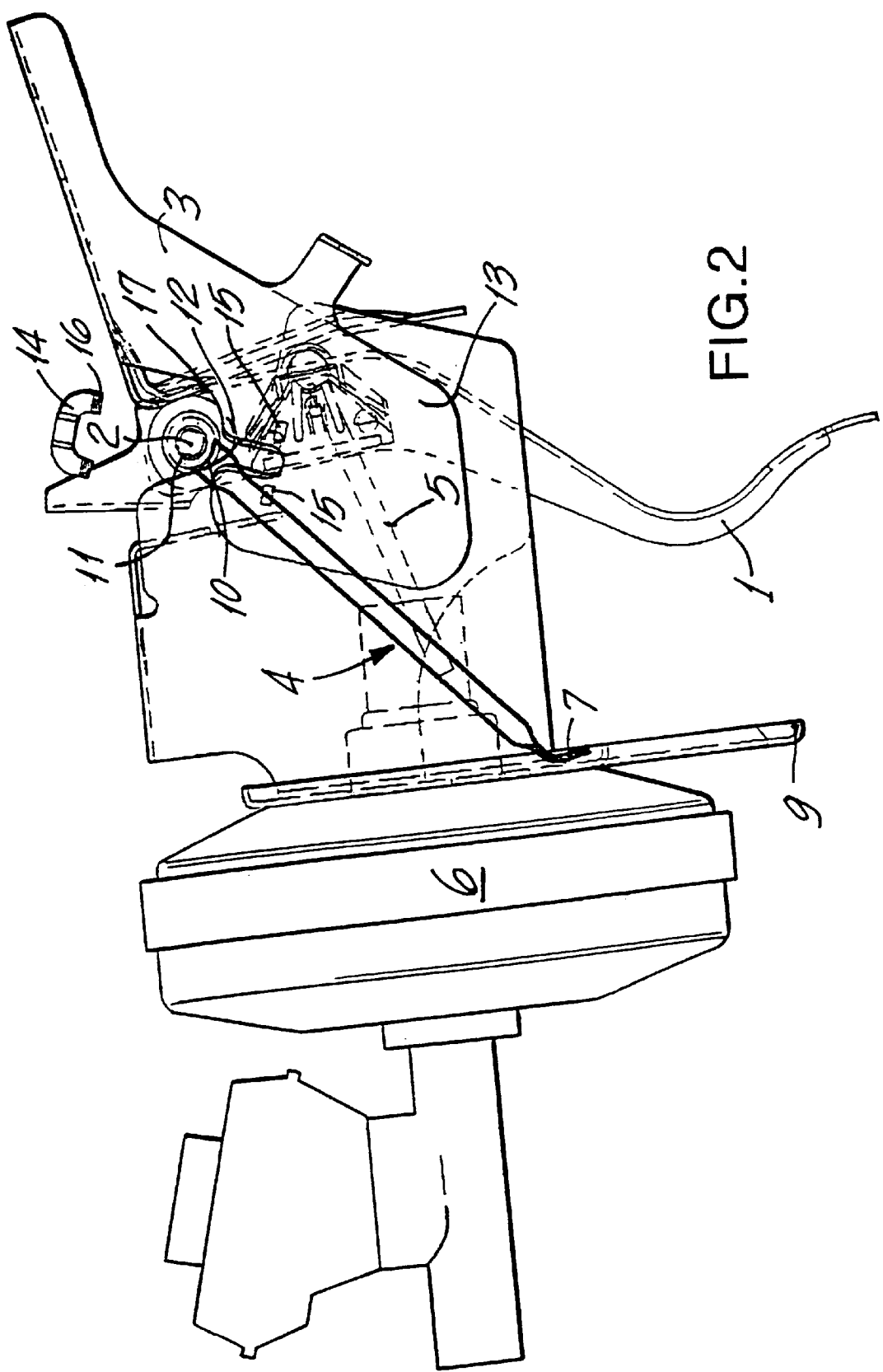
FIG. 2 shows a side view of the pedal suspension shown in FIG. 1 after a frontal collision of the vehicle.

During a normal operational position which is shown in FIG., 1 the pedal shaft 2 lies on a bottom of a respective bearing recess 12 and is retained in this position by a retaining member which in the embodiment shown in FIGS. 1 and 2, is formed as a spring clip 14. The spring clip 14 overlaps the pedal shaft 2 and is retained, in its normal position, in the detent recesses 15 of the legs 13 of the bearing support 3. The clip 14 has detent noses 16 which engage in the detent recesses 15. In this position, the longitudinal axis of the brace-shaped lifting element 4 forms with a longitudinal axis or a longitudinal extent of the recess 12, in which the pedal shaft support 11 is received, an angle greater than 90°. During a frontal collision, the wall portion of the front wall, which carries the lifting element 4, is deformed, and the lifting element 4 moves relative to the bearing support 3, which is secured to the cross-member, attaining a position shown in FIG. 2. The pedal shaft 2 is lifted by the shell segment-shaped end 10 of the lifting element 4 off the upwardly open recesses 12, with the pedal 1 being lifted from the foot region of the motor vehicle upward, as a result. In its lifted position, the pedal 1 lies on the end 10 of the lifting element 4. Thus, during a frontal collision of the motor vehicle, no separate elements of the pedal unit can emerge.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A safety device for supporting a pedal in a motor vehicle, comprising:

a bearing support for supporting a pedal shaft of the pedal and locatable between a wall portion of a front wall of the motor vehicle which is deformed inward into a passenger compartment during a frontal collision of the motor vehicle, and a cross-member which is located in the passenger compartment in a spaced relationship with respect to the front wall, is secured to a motor vehicle body, and does not substantially change a spatial position thereof during the frontal collision, the bearing support being locatable in a spaced relationship to the front wall and including radially open bearing means in which the pedal shaft is supported and which absorbs reaction forces generated during actuation of the pedal necessitated by operational conditions of the motor vehicle; and means for lifting the pedal shaft out of the bearing means of the bearing support in case of the frontal collision, the lifting means comprising a brace having one end thereof adapted to be supported against the front wall of the motor vehicle and having another end thereof engageable with a pedal shaft support.

2. A safety device as set forth in claim 1, wherein the brace is formed as a section of a hollow profile, wherein the one end of the brace is formed as a bent foot portion extending parallel to the front wall, and wherein the another end of the brace is formed as a segment of a shell embracing the pedal shaft support.

3. A safety device as set forth in claim 1 wherein the pedal shaft and the pedal shaft support are supported in substantially U-shaped, upwardly opening, recesses formed in the bearing support, and wherein at least one of the pedal shaft support and the pedal shaft is retained in a respective U-shaped recess with a retaining member ejectable upon occurrence of the frontal collision.

4. A safety device as set forth in claim 3, wherein a longitudinal axis of the brace forms with a longitudinal axis of a U-shaped recesses, in which the pedal shaft support is received, an angle greater than 90°.

5. A safety device as set forth in claim 3, wherein the retaining member is formed as a spring clip ejectable, during a frontal collision, together with the pedal shaft, from a U-shaped recesses, in which the pedal shaft is received, by the brace.

* * * * *